Patented Oct. 4, 1932

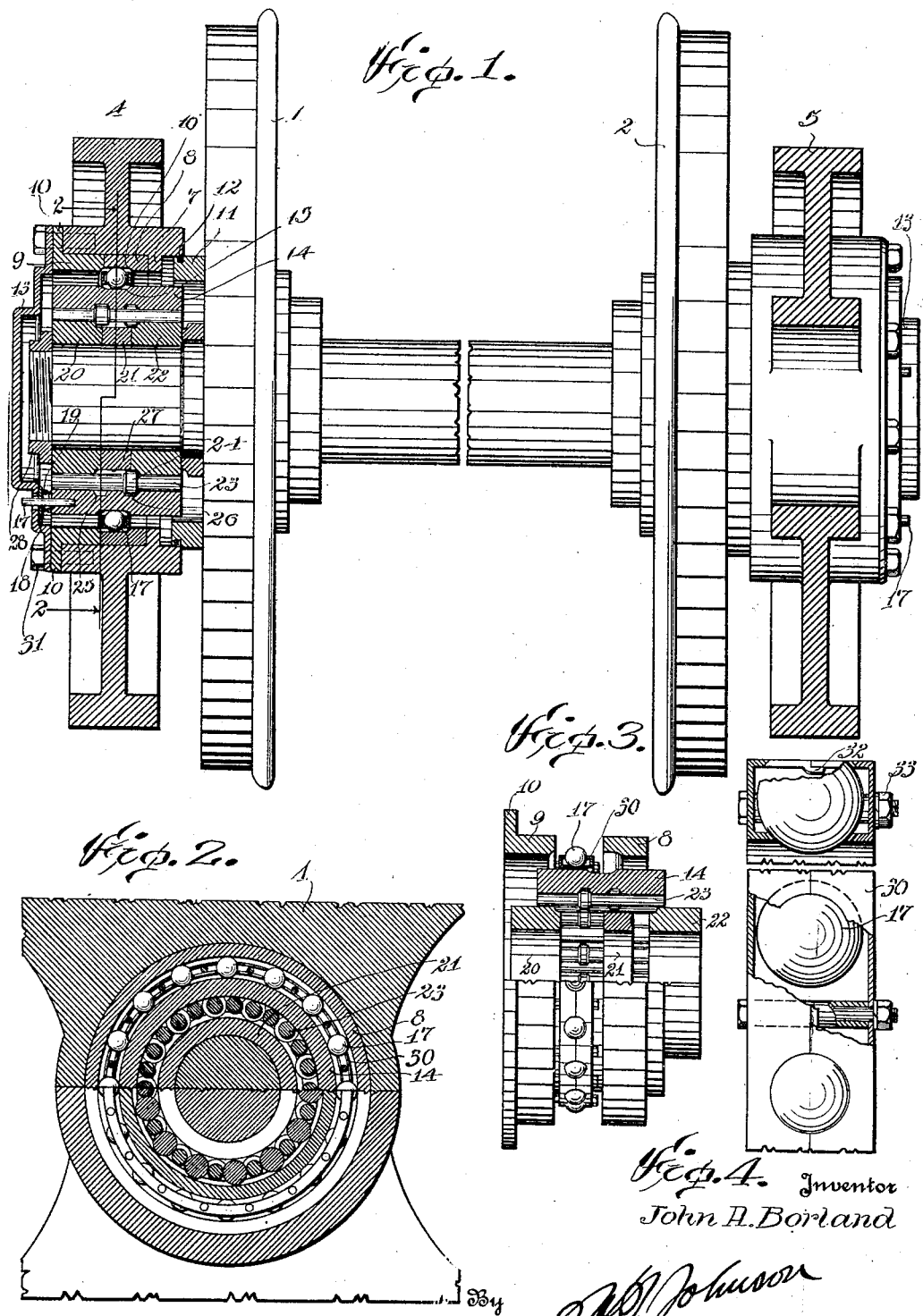

1,880,738

UNITED STATES PATENT OFFICE

JOHN A. BORLAND, OF ST. PAUL, MINNESOTA, ASSIGNOR TO BORLAND TRANSPORTATION AND MANUFACTURING COMPANY, A CORPORATION OF ARIZONA

ROLLER BEARING

Application filed April 16, 1931. Serial No. 530,471.

The present invention relates to a roller bearing construction which is particularly adapted for use in a railway coach.

In the making of roller bearings for railway coaches, serious problems are encountered, due to the fact that when several pairs of wheels are mounted on a single truck, the intermediate pairs of wheels must be free for a slight lateral movement with respect to the end wheels in rounding curves.

An object of the present invention is to make an improved roller bearing.

A further object is to make a roller bearing construction which is particularly adapted for railway coaches and in which the bearing will be free for limited lateral movement with respect to a truck frame upon which it is mounted.

In order to attain these objects, there is provided, in accordance with one feature of the invention, a roller bearing having an inner annular grooved member secured to the axle of a pair of wheels and having an outer annular grooved member mounted around this inner annular member and spaced therefrom. Rollers provided with flanges adapted to ride in the grooves in said annular members are mounted in the space between said inner and outer annular members. The outer annular member is held against rotation but is mounted on a ball bearing so as to be free for a limited lateral movement with respect to a truck frame in which the bearing is mounted.

These and other features of the invention will be more fully brought out in the following description and the accompanying drawing, wherein:

Figure 1 is a view showing a pair of railway car wheels supported in a truck frame, a truck frame being shown sectionally on the right hand side of the drawing with a bearing housing shown in elevation, and on the other side of the drawing is shown a vertical transverse sectional view through the truck frame and bearing.

Figure 2 is a sectional view on the line 2—2 of Figure 1.

Figure 3 is a view in side elevation of a bearing assembly separately from the truck frame and axle, the upper portion of the bearing being broken away, and a composite inner roller race member being spread apart to show the construction of the bearing; and Figure 4 is an enlarged view of a portion of a ball retaining ring, parts thereof being broken away to show the construction thereof.

Referring to the drawing in detail, a pair of railway car wheels 1 and 2 are of a conventional type of construction, with an axle 3 fixedly secured thereto. The axles are supported between side truck frame members 4 and 5, and, as the construction of truck side frame members is well known to the art, it is believed to be unnecessary to illustrate and describe them in detail.

Round bearing-box openings are provided in each of the truck side frame members for each axle which it is desired to mount in the truck. Projecting radially inward from each of these bearing-box openings is an annular flange 7 against the outer side of which seats one portion 8 of a split annular ball bearing race member. An outer portion 9 of this split race member has an outwardly projecting flange 10 around its outer edge, which rests upon the outer face of the bearing box opening. The inner faces of the members 8 and 9 are machined out as at 10 so that when placed together, as shown in Figure 1, the depressions 16 form a groove for balls 17. A flange 11 carried by the wheel 1 rotates within the bearing-box opening and is preferably provided with a felt wipe ring 12 mounted in an annular groove in the exterior of the flange 10 to make a dust-tight seal with the bearing-box opening.

A stamped or cast metal plate 13 covers the outer face of the bearing-box to exclude dust and dirt from the bearing. Mounted interiorly of the split annular race member composed of the members 8 and 9, and spaced radially inwardly therefrom, is an outer roller race member 14 having a groove 15 on its outer periphery, which is positioned opposite the groove 16 on the inner surfaces of the members 8 and 9. The members 8 and 9 are preferably constructed so that the division between them lies at one side of the ball bearing groove 16 so that the balls will not ride on the line of division between these members. The grooves 15 and 16 are wide enough to permit a limited lateral movement of the members 8 and 9 with respect to the member 14. A ball bearing ring 30 is mounted between the grooves 15 and 16.

A plurality of pins 17 are carried by the outer roller race member 14 to project through openings in the cover plate 9 and a washer 18, which may be of felt, is held tightly as by means of a coil spring 19 against the inner face of the cover plate 9 around each of the pins 17 to form a dust proof seal across these openings. These pins 17 prevent rotation of the outer roller race member 14 and at the same time permit a limited lateral movement thereof, with respect to the members 8 and 9.

A split inner roller race member is composed of three annular members 20, 21, and 22, spaced inwardly from the outer roller race member 14 sufficiently to receive rollers 23 between the outer member and the annular members 20, 21, and 22. Each of the rollers 23 is provided with an annular flange 24 which rides in grooves in the inner and outer roller race members, respectively. The flanges 24 on the rollers are formed a required distance away from the centers of the rollers and the outer roller race member 23 is formed with two grooves 25 and 26 spaced outwardly from the center plane of this race member the same distance that the flanges are spaced from the centers of the rollers 23. The outer surfaces of the members 20, 21, and 22 are machined, as shown, so that when assembled, as shown in Figure 1, there will be formed a groove 27 extending the entire width of the grooves 25 and 26. The rollers are positioned with the flanges 24 thereof arranged to ride in the grooves 25 and 26 in alternately offset position so as to hold the rollers in properly spaced position within the bearing. The flanges 24 are smaller in diameter than the depths of the grooves 25, so as not to engage the bottoms of these grooves. The rollers themselves thus absorb the weight stresses on the bearing and the flanges 24 act to hold the rollers 23 in properly spaced position with respect to each other and prevent endwise displacement of the rollers 23. The flanges 24 also serve to prevent endwise movement of the inner and outer roller race members with respect to each other. The composite inner roller race member, composed of the members 20, 21, and 22, is fixedly secured to the axle 3 to rotate therewith and is held in position by means of a nut 28 which is threaded onto the outer end of the axle and overlies the outer face of the inner roller race member 20. The entire roller bearing assembly, consisting of the inner roller race, members 20, 21, and 22, the outer roller race member 14, the rollers 23 and the axle 3, is thus free for limited lateral movement upon the balls 17.

The ball bearing prevents any binding against endwise movement of the bearing within the limits of its movement, and, at the same time, the inner and outer race members are held in proper relation with respect to each other by means of the flanges 20 on the rollers.

To assemble the bearing, the members 21, and 22, are preferably mounted on the axle 3. The member 14 is then slipped over the members 21 and 22 so that the grooves 25 and 26 are outwardly beyond the member 21. The rollers 23 are then placed in position with their inner end portions between the ring 22 and the ring 14 and with the flanges thereof positioned in radial alinement with the grooves 25 and 26, respectively. The outer ring 20 is then placed in position and the parts are moved to the position shown in Figure 1 with the flanges 24 lying in their proper respective grooves 25 and 26. The nut 28 is then threaded onto the outer end of the axle and is screwed tightly thereon so as to hold the rings 20, 21, and 22 in position. The ring 8 is then placed in position within the bearing box against the flange 7 and the roller bearing assembly is moved into the housing within the ring 8 and is pushed in so that the flange 7 rests against the flange 11 on the wheel 1. The ball bearing ring 30 is then moved into position, the ball bearing ring being of a size to slip over the outer roller race member 14, as shown in Figure 3. The ball ring 30 is moved in so that the balls 17 rest in the groove 16 in the periphery of the outer roller race member 14. The ring 9 is then moved into the position shown in Figure 1 and the cover plate 13 is placed in position with the pins 17 projecting through the openings provided therefor in the cover plate. The cover plate is then bolted in position by means of bolts 31 which pass through the flange 10 and securely fasten the member 9 and the cover plate in position on the frame. This completes the assembly, as shown in Figure 1.

The ball ring is preferably made in two sections, as best illustrated in Figure 4. These sections are preferably provided with overlapping tongues 32, see Figure 4, to secure the two halves of the ring in proper position. Small bolts 33 hold the two halves of the ring 30 together. The balls are mounted in the ring in a well known manner, the balls being free for sufficient outward movement with respect to the ring so as to permit slipping the ring over the outer roller race member 14, as above described, and as illustrated in Figure 3.

I claim:

1. A railway car roller bearing, comprising an annular bearing housing having an annular groove in the inner side thereof, a ball race mounted in said groove, an annular sleeve mounted interiorly of said housing member, and having a groove in the outer periphery thereof to receive said ball race thereon, said annular sleeve having a pair of annular grooves in the inner surface thereof, a second annular sleeve mounted interiorly of said outer annular member and having a pair of annular grooves in the outer surface thereof radially opposite to the grooves in the inner surface of said outer annular member, and a plurality of rollers mounted in the space between said inner and outer annular members, each of said rollers having a flange thereon, said flanges being positioned to lie in the grooves in said inner and outer annular members.

2. A railway car bearing, comprising a bearing housing, a ball race mounted interiorly thereof, an outer annular member mounted interiorly of said bearing housing to have a limited lateral movement with respect to said bearing housing, said outer annular member having a pair of grooves in the inner surface thereof, said grooves being spaced equally distant from the center of said outer annular member, an inner annular member mounted interiorly of said outer annular member and having a pair of grooves on the outer surface thereof in radial alinement with said grooves in said outer annular member, and a plurality of rollers mounted between said inner and outer annular members, each of said rollers having a radially projecting annular flange thereon, said flange being of a lesser height than the depth of said grooves in said outer and said inner annular members, each of said rollers having the flange thereof mounted in one of said pairs of grooves to prevent longitudinal displacement of said inner and outer annular members with respect to each other.

3. A railway car bearing, comprising a bearing housing, a cover plate mounted to cover the outer end of said bearing housing, a ball race mounted interiorly of said bearing housing, an outer annular member mounted interiorly of said ball race to have a limited lateral movement with respect to said bearing housing, a plurality of pins carried by said outer annular member and projecting through said cover to prevent rotation of said outer annular member, an inner annular member mounted interiorly of said outer annular member to rotate therein, a plurality of rollers mounted between said outer and inner annular members, and flanged means carried by said rollers and adapted to engage said inner and said outer annular members to prevent lateral displacement of said members with respect to each other.

4. A roller bearing construction, comprising an inner annular member having a groove in the periphery thereof, an outer annular member having a pair of laterally spaced grooves of lesser width than said groove in said inner annular member and in radial alinement therewith, a plurality of rollers mounted in the space between said inner and outer annular members, each of said rollers having a flange thereon, said flanges being of lesser height than the depth of any of said grooves, said rollers being mounted with their flanges mounted alternately in opposite grooves in said outer annular member.

5. A roller bearing construction, comprising an inner annular member having a groove in the periphery thereof, an outer annular member having a pair of laterally spaced grooves interiorly thereof, the combined width of said grooves being less than the groove in said inner annular member, a plurality of rollers, each being provided with a flange thereon, said rollers being mounted with their flanges positioned alternately in opposite grooves in said outer annular member, a groove in the periphery of said outer annular member, a ball bearing mounted in said peripheral groove in said outer annular member, and a member mounted around said ball bearing and having a groove interiorly thereof, said groove and the peripheral groove in said outer annular member being of a width to permit a limited lateral movement of said ball bearing with respect to said groove.

In testimony whereof I affix my signature.

JOHN A. BORLAND.